Patented Mar. 3, 1942

2,275,232

UNITED STATES PATENT OFFICE 2,275,232

TREATING HYDROCARBON FLUIDS

Francis Owen Rice, Montgomery County, Md., assignor, by mesne assignments, to Process Management Company, Inc., Wilmington, Del., a corporation of Delaware No Drawing. Application June 1, 1939, Serial No. 276,809

10 Claims. (Cl. 260—683)

This invention relates to the treatment of hydrocarbon fluids.

According to this invention higher molecular weight hydrocarbons are catalytically treated to produce lower molecular weight hydrocarbons which may be further treated as desired. It has been found that small amounts of oxygen added to normally gaseous hydrocarbons increase the yield of unsaturated hydrocarbons as compared to a non-catalytic thermal decomposition and the decomposition takes place at lower temperatures.

Oxygen is intimately mixed with the hydrocarbon below reaction temperature and the hydrocarbon is then quickly heated to the reaction temperature and is maintained at the reaction temperature for a relatively short time. When normally gaseous hydrocarbons are to be converted, the reaction temperature is maintained less than about one minute. The reaction products are then preferably quickly cooled to prevent undesirable reactions from taking place. By carrying out the decomposition at a lower temperature it is easier to control the reaction. The reaction is preferably carried out at about atmospheric pressure but lower or higher pressures may be used.

More specifically it has been found that under certain conditions, oxygen in relatively small amounts when added to normally gaseous hydrocarbons such as ethane, propane and butane or mixtures containing such gases acts as a promoter to increase the thermal yield of conversion products containing lower molecular weight unsaturated hydrocarbons. For this conversion and to have the oxygen effective as a promoter, it is necessary to raise the hydrocarbon to a temperature at which the hydrocarbon will decompose at a measurable rate in the absence of oxygen. The added oxygen increases the rate of decomposition of the hydrocarbon. The effect of the promoted or catalyzed reaction increases rapidly with temperature. The time of the catalytic reaction decreases with increase of pressure.

For example, relatively cool propane containing about 1% of oxygen by volume is quickly heated to about 940° F. and the catalytic effect is complete in about one minute. After one minute, any further decomposition of the propane is due to the uncatalyzed thermal decomposition. As the uncatalyzed decomposition is relatively small and, due to the possibility of unfavorable reactions occurring between the reaction products, it is better practice to stop the decomposition after the catalytic reaction is substantially complete. At a higher temperature the catalytic decomposition increases rapidly. For example, propane containing about 1% oxygen by volume is heated to about 1200° F. and the catalytic effect is completed in about 9 seconds. During this time thermal decomposition also takes place but the oxygen promotes and increases the yield of the conversion products. Due to the relatively high temperature used, it is advisable to cool the reaction products immediately after the catalytic conversion to avoid the formation of undesirable products.

At higher temperatures the time of the catalytic reaction will be further decreased. From the above it will be seen that it is important that the gas with its added oxygen be brought to its maximum temperature as quickly as possible. The percentage of added oxygen may vary from about 0.10% to about 2% by volume. In all instances the added oxygen increases the thermal yield of conversion products.

When using oxygen as a promoter for conversions of hydrocarbons, it is important to mix the oxygen with the hydrocarbon below reaction temperature with the oxygen and to obtain a good distribution of the oxygen in the hydrocarbon before heating the mixture to a reaction temperature. The temperature at which the hydrocarbons and oxygen are mixed is well under a temperature at which conversion of the hydrocarbons occurs at which the oxygen merely oxidizes the hydrocarbons without having a catalytic effect. Instead of using oxygen, gaseous mixtures containing oxygen may be used.

One method of obtaining good distribution or diffusion of the oxygen in the hydrocarbon is to pass the oxygen through porous material positioned adjacent or submerged in the stream or body of hydrocarbons to be treated. The porous material may be shaped in any desired manner and may, for example, be thimble-shaped. After the oxygen is thoroughly mixed with the relatively cool hydrocarbon to be treated, the mixture is quickly heated to the desired conversion temperature for a relatively short period of time to effect the desired conversion.

Another method of obtaining good distribution of the oxygen in the substrate is to use a mixing chamber wherein the oxygen and substrate are mixed at a relatively low temperature such that no reaction occurs. Suitable fans, stirrers or baffles may be used to insure substantially complete distribution of the oxygen in the substrate. Or instead of using mechanical means for causing mixture in the mixing chamber, I may introduce oxygen and the substrate into a mixing chamber and allow a fairly long period for natural mixing by diffusion to occur. However, it is preferred to use mechanical mixing means to obtain intimate mixing of the oxygen and substrate.

The invention is not to be restricted to the above methods of introducing oxygen into the hydrocarbons to be treated as these methods are given merely by way of example.

One example of the invention describing the treatment of propane will now be given but this is given merely by way of illustration and is not intended as a limitation of the invention as the conditions and amounts of constituents may be changed. Propane intimately mixed is mixed with about .96% of oxygen by volume below reaction temperature and the mixture, at about atmospheric pressure, is quickly heated to about 940° F. in a suitable reaction zone. The oxygen acts to promote the thermal decomposition of the propane to form unsaturated hydrocarbons containing ethylene and propylene. At this temperature the catalytic effect of the added oxygen is complete in less than about one minute and about 6% of the propane is converted into unsaturated compounds. If the conversion is continued beyond about one minute, thermal decomposition continues but at a much slower rate than the total conversion during the first minute.

In another example, propane intimately mixed with about 1% of oxygen by volume was quickly heated to about 1200° F. at about a half atmosphere pressure in a suitable reaction zone. At this temperature the catalytic effect of the added oxygen reaches its maximum after about 10 seconds and if the conversion is carried beyond this time, polymerization sets in. It is therefore advisable to quench or cool the reaction products after about 10 seconds to obtain the largest yield of unsaturated hydrocarbon products. The yield of unsaturates obtained is about 22.5%. This time of reaction or catalysis will decrease at higher pressures and higher temperatures. With lower percentages of oxygen the yields of unsaturated compounds will be lower.

In the catalytic decomposition of ethane it was found that ethane is not so sensitive to changes in temperature, pressure and amount of added oxygen as are propane and butane. The proportion of oxygen by volume may vary between about one-tenth of a percent to about two percent. At about 1200° F. and with 1% of added oxygen about 13% of ethane was decomposed to form unsaturated compounds.

In decomposing butane catalytically and using about .75% of oxygen as a promoter, lower temperatures may be used, for example 975° F., to obtain decomposition into about 15% unsaturated compounds. The time of heating is about 10 seconds.

In using the process of my invention, the converted products may be treated to separate unsaturated compounds from unconverted hydrocarbons and the unconverted hydrocarbons may be recycled for further conversion treatment.

My invention may be used to promote the conversion of hydrocarbon oils into lighter products. Relatively small amounts of oxygen may be thoroughly mixed with higher boiling hydrocarbons, such as gas oils, below reaction temperature. The mixture is then heated to reaction temperature for a relatively short time during which time the added oxygen acts as a promoter or catalyst to hasten the conversion into lower boiling hydrocarbons containing gasoline constituents.

While examples of the invention have been given it is to be understood that they are by way of illustration only and the temperature and pressure conditions, the times of heating and proportions may be changed without departing from the spirit of my invention.

I claim:

1. A process for treating hydrocarbons capable of thermal decomposition to form olefin hydrocarbons of lower molecular weight which comprises intimately mixing with said hydrocarbons a small proportion of oxygen at a temperature insufficiently high to effect any reaction of said oxygen with said hydrocarbons and then rapidly heating the resulting mixture in the absence of halogens and halogen compounds to a temperature effective to promote decomposition of said hydrocarbons in the absence of said oxygen whereby the oxygen present in said mixture accelerates said decomposition to a rate substantially greater than could be attained under similar conditions in the absence of said oxygen.

2. A process in accordance with claim 1 wherein said mixture is maintained at a decomposition temperature for a time substantially shorter than would be required to effect substantial decomposition of said hydrocarbons in the absence of said oxygen.

3. A process in accordance with claim 1 wherein said mixture is maintained at a decomposition temperature for a time not substantially longer than one minute.

4. A process for decomposing propane to form olefinic hydrocarbons which comprises intimately mixing oxygen with said propane to the extent of one tenth per cent to two per cent of the resulting mixture of propane and oxygen at a temperature insufficiently high to effect any reaction of the oxygen with the propane, then rapidly heating the resulting mixture to a decomposition temperature not substantially lower than 940° F., and maintaining the mixture at the said decomposition temperature for a time not substantially longer than one minute.

5. A process in accordance with claim 4 wherein said oxygen is mixed with said propane to the extent of approximately one per cent and the length of time during which the mixture is maintained at the decomposition temperature is regulated with reference to the decomposition temperature whereby at reaction temperatures not substantially higher than 940° F. the time does not exceed about one minute and at reaction temperatures of approximately 1200° F. the time does not exceed about ten seconds.

6. A process for decomposing hydrocarbons consisting substantially of normally gaseous paraffin hydrocarbons having at least two carbon atoms per molecule which comprises intimately mixing oxygen with said hydrocarbons to the extent of one-tenth to two per cent of the mixture of oxygen and said hydrocarbons at a temperature insufficiently high to effect any reaction of said oxygen with said hydrocarbons, and then rapidly heating the resulting mixture to a temperature effective to promote decomposition of said hydrocarbons in the absence of said oxygen whereby the oxygen present in the mixture accelerates said decomposition to a rate substantially greater than could be obtained under similar conditions in the absence of said oxygen.

7. A process in accordance with claim 6 wherein the said oxygen constitutes approximately one per cent of the mixture of oxygen and said hydrocarbons.

8. A process for treating hydrocarbons capable of thermal decomposition to form olefin hydrocarbons of lower molecular weight which comprises intimately mixing with said hydrocarbons a small proportion of oxygen to the extent of one-tenth per cent to two per cent of the mixture of oxygen and hydrocarbons at a temperature insufficiently high to effect any reaction of said oxygen with said hydrocarbons, and then rapidly heating the resulting mixture to a temperature effective to promote decomposition of said hydrocarbons in the absence of said oxygen whereby the oxygen present in the mixture accelerates said decomposition to a rate substantially greater than could be attained under similar conditions in the absence of said oxygen.

9. A process in accordance with claim 8 wherein said mixture is maintained at a decomposition temperature for a time substantially shorter than would be required to effect substantial decomposition of said hydrocarbons in the absence of said oxygen, said time being not substantially greater than that necessary to complete the catalytic decomposition reaction.

10. A process in accordance with claim 8 wherein said mixture is maintained at a decomposition temperature for a time not substantially longer than one minute.

FRANCIS OWEN RICE.